United States Patent
Kribus et al.

[11] Patent Number: 5,947,114
[45] Date of Patent: Sep. 7, 1999

[54] CENTRAL SOLAR RECEIVER WITH A MULTI COMPONENT WORKING MEDIUM

[75] Inventors: Avi Kribus; Pinchas Doron; Jacob Karni, all of Rehovot, Israel

[73] Assignee: Yeda Research and Development Company Ltd., Rehovot, Israel

[21] Appl. No.: 08/894,343

[22] PCT Filed: Feb. 6, 1996

[86] PCT No.: PCT/US96/01476

§ 371 Date: Nov. 4, 1997

§ 102(e) Date: Nov. 4, 1997

[87] PCT Pub. No.: WO96/25633

PCT Pub. Date: Aug. 22, 1996

[30] Foreign Application Priority Data

Feb. 15, 1995 [IL] Israel ............................... 112658

[51] Int. Cl.⁶ .................. F24J 2/02; F24J 2/30; B01D 17/06
[52] U.S. Cl. .................. 126/680; 126/678; 126/704; 126/643; 126/651; 210/748
[58] Field of Search .................. 126/678, 680, 126/681, 690, 704, 701, 643, 651; 165/904; 422/186.3, 22, 186; 210/748

[56] References Cited

U.S. PATENT DOCUMENTS

| | | | |
|---|---|---|---|
| 1,969,655 | 8/1934 | Mailey | 422/186.3 |
| 2,728,859 | 12/1955 | Gochenour et al. | 422/186.3 |
| 4,405,594 | 9/1983 | Pyle | 423/579 |
| 5,058,564 | 10/1991 | Delacretaz et al. | 126/680 |
| 5,266,215 | 11/1993 | Engelhard | 210/748 |
| 5,540,848 | 7/1996 | Engelhard | 210/748 |

Primary Examiner—Ira S. Lazarus
Assistant Examiner—David Lee
Attorney, Agent, or Firm—Gary M. Nath; Nath & Associates

[57] ABSTRACT

A central solar receiver comprising a tubular housing with a central axis, a radiation admitting aperture and an absorber chamber having an outer wall, two oppositely located ends, an inner-wall-forming substantially tubular transparent window co-axial with the tubular housing. The solar receiver further comprises injection means near a first of the oppositely located ends and at least one egress opening means near a second of the oppositely located ends. The injection means are capable of injecting into the absorber chamber a multicomponent fluid mixture comprising at least one radiation absorbing component and are so designed that the fluid mixture is injected into the absorber chamber adjacent and essentially tangentially to the outer wall, whereby contact between the mixture and the window is reduced. The egress opening enables the egress of the fluid mixture from the absorber chamber.

28 Claims, 3 Drawing Sheets

CENTRAL SOLAR RECEIVER WITH A MULTI COMPONENT WORKING MEDIUM

FIELD AND BACKGROUND OF THE INVENTION

The invention relates to a central solar receiver with a volumetric radiation absorber of the kind that absorbs concentrated solar radiation at a high temperature and transfers heat to a working fluid and, particularly, to such a receiver where the absorber and the working fluid constitute a multicomponent fluid mixture so that the working fluid components are in direct contact with the radiation absorbing components. Thereby, the absorbing components of the mixture either heat up the working fluid components or participate in a chemical reaction therewith or act as catalysts for a chemical reaction among the other components.

The phases of absorbing components in the multicomponent fluid mixture may be different from that of the working fluid components thereof. Thus, often the mixture consists of solid particles suspended in the working fluid. For example, Evans et al. (J. Solar Energy Eng. 109, pp. 134–142, 1987) discloses circulation of a mixture of gas and solid particles through a large atmospheric pressure cavity, which is isolated from the environment by a forced gas flow across the aperture. Rightley et al. (Solar Energy, 48, pp. 363–374, 1992) suggests a free-falling particle receiver, where a curtain of spherical beads was exposed to solar radiation through an open aperture in the receiver. Imhof (Solar Energy Materials, 24, pp. 733–741, 1991) and Steinfeld et al. (J. Solar Energy Eng., 114, pp. 171–174, 1992) investigate an atmospheric cyclone reactor, where a vortex-type flow provides for separation of solid particles from the carrier fluid. A double walled cylindrical cavity with swirling flow and windowless aperture is disclosed by Ganz et al. (7th Int. Symp. Solar Thermal Concentrating Technologies, Moscow, Russia, 1994). A rotary kiln configuration is employed by Kelbert and Royere (Proc., 4th Int. Symp. Solar Thermal Technology, pp. 327–336, Santa-Fe, N.Mex., 1988) to heat sand to 1200 K. In all these designs the working fluid is introduced into the receiver at atmospheric pressure with the radiation entering the receiver through the open aperture.

With the solar receivers having a volumetric radiation absorber, the thermal efficiency of the absorber depends among others on the rate of heat transfer from the radiation absorber to the working fluid. A high rate of heat transfer requires a high mass flow rate of the working fluid. To increase such mass flow rate while minimizing friction losses, the working fluid in a central solar receiver with a volumetric radiation absorber is pressurized. Elevated pressure of heated working fluid withdrawn from a central solar receiver is also required for applications, such as driving an electric power generating turbine. To reconcile the need for a pressurized working fluid with the requirement for direct heating of the volumetric absorber, the absorber and working fluid have to be contained within a sealed enclosure having a window that is transparent to the incident concentrated radiation.

In addition, sealing off of the volumetric radiation absorber in a central solar receiver with the provision of a transparent window is, as a rule, also required where the working fluid is not pressurized, in order to prevent the working fluid and any products of reaction between its components from escaping into the ambient atmosphere.

A central solar receiver satisfying the above requirements is disclosed, for example, in U.S. Pat. No. 5,323,764. However, this design is suitable only for the volumetric radiation absorber in the form of a stationary solid body such as an array of absorber members.

Many attempts have been made to design a windowed receiver with a particulate absorber. Thus, Miller (Proc. 6th Int. Symp. Solar Thermal Concentrating Technologies, pp. 371–385, Almeria, Spain, 1992) proposes a concept for a vertical cylindrical central receiver, which may be windowed; this configuration cannot support high pressure. Gregg et al. (Solar Energy, 25, pp. 353–364, 1980) gasifies fixed beds of coal, biomass and oil shales in an L-shaped reactor, with sunlight penetrating through a quartz window. Although the window is kept clean and cool by gas injection, this design allows only low pressure, and is difficult to integrate with continuous processes. Gasification of oil shales by pyrolysis in a bed fluidized by pressurized argon is disclosed in Ingel et al. (Energy, 18, pp. 827–842, 1993 and Energy17, pp. 1189–1197, 1993), but the thermal efficiency in this configuration is low and cannot support high pressure. Antal et al. (Solar Energy, 30, pp. 299–312, 1983) attempted flash pyrolysis of biomass in a vertical quartz tube. The tube was damaged by devitrification where carbon had deposited. Development of a windowed circulating fluidized bed receiver (Koenigsdorff, Proc. 6th Int. Symp. Solar Thermal Concentrating Technologies, pp. 347–358, Almeria, Spain, 1992, and Litterst, Proc., 6th Int. Symp. Solar Thermal Concentrating Technologies, pp. 359–369, Almeria, Spain, 1992) was not successful since in this case, similarly to all the designs described above, no solution was found to prevent contact between the particles of the absorbing component and the window of the receiver, causing mechanical and thermal damage and deterioration of optical properties thereof. Moreover, none of the proposed design configurations could not support high pressure.

GENERAL DESCRIPTION OF THE INVENTION

It is the object of the present invention to provide a highly efficient central solar receiver having a window for radiating directly a volumetric radiation absorber which is in the form of a component in a multicomponent fluid mixture.

The term "fluid mixture" signifies a mixture of two or more components of which at least one is a radiation absorbing component and at least one other is a working fluid component. The radiation absorbing component may be in either solid or liquid or gas phase, while the working fluid component is in the form of one or more gases or liquids. For the sake of simplicity and consistency of terminology the term "particles" will refer to both radiation absorbing solid particles and radiation absorbing liquid drops or droplets.

It has been found in accordance with the invention that, with the fluid mixture having a high temperature and/or with the absorbing component of the fluid mixture being in the particulate form, the fluid mixture needs to be kept away from the window in order to prevent its thermal and/or mechanical damage.

In order to solve this problem, there is provided, in accordance with the present invention, a central solar receiver comprising a tubular housing with a central axis, a radiation admitting aperture and an absorber chamber having an outer wall, two oppositely located ends, an inner-wall-forming substantially tubular transparent window co-axial with said tubular housing, injection means near a first of said oppositely located ends and at least one egress opening means near the second of said oppositely located ends, characterized in that said injection means are capable of injecting into the absorber chamber a multicomponent fluid mixture comprising radiation absorbing component, said at least one egress opening being capable of enabling the egress of the fluid mixture from the absorber chamber, and said injection means are so designed that the fluid mixture is injected into the absorber chamber adjacent and essentially tangentially to the outer wall, whereby contact between the mixture and the window is reduced.

Preferably, said injection means are capable of injecting the fluid mixture with a measure of inclination towards the second of said oppositely located ends, whereby the fluid mixture passes through the absorber chamber from the first to the second of said oppositely located ends in an essentially swirling flow.

During the swirling flow of the fluid mixture across the absorber chamber, the driving force has axial and radial components. The axial force component provides for the advancement of the fluid mixture through the absorber chamber from the first to the second of said oppositely located ends, and the radial component provides a centrifugal force by which the mixture is drawn away from the inner wall-forming window toward the outer wall of the absorber chamber, whereby contact between the mixture and the window is eliminated or minimized.

In a preferred embodiment of the invention the absorber chamber and window are frusto-conical. In such an embodiment the large diameter end of the absorber chamber is the front end at which the concentrated solar radiation is admitted, and the opposite end is the rear end.

If desired the absorber chamber and window may be cylindrical.

Preferably, the fluid mixture is injected under elevated pressure, e.g. within the range of 1 to 100 atm.

In accordance with a further preferred embodiment of the present invention, a plurality of injectors are provided in even distribution at the first of said oppositely located ends of the radiation absorber chamber. For example, there may be provided at this end of the absorber chamber an annular injection device with front and rear sides, having at the rear side a plurality of injection tubes, preferably, with a measure of inclination toward the opposite end of the chamber.

Preferably, in the above preferred embodiment the said at least one egress opening is so designed as not to interfere with the swirling flow of the particle suspension inside the absorber chamber. For example, there may be provided near the second of said oppositely located ends of the absorber chamber an annular collection device with a helical gliding surface leading into an egress opening linked to a withdrawal duct.

Preferably, each egress opening has a sharp edged rim whereby the formation of stagnation points, the separation of a boundary layer and the creation of recirculation zones is prevented.

Also preferably, a central solar receiver according to the invention comprises means for sweeping the inner face of the window with particle-free pressurized working fluid, whereby the window is cooled and cleaned from within, and means for sweeping the outer face of the window with ambient air whereby the window is cooled and cleaned from outside.

The central solar receiver according to the invention may serve for the generation of utilizable heat in which case the radiation absorbing component is inert to the other components of the fluid mixture. The receiver may also serve for the performance of a heat induced chemical reaction, in which case one or more components of the fluid mixture are of materials selected from the group consisting of chemical reactants and catalysts. In this case, the egress opening has to enable the egress of chemical reaction products from the absorber chamber.

If desired, a central solar receiver according to the invention may be associated with means for separation of the fluid mixture components withdrawn from the radiation absorbing chamber, and some of the separated components may, if desired, be recycled. Alternatively, or in addition, the central solar receiver may have means for the direct recirculation of the withdrawn medium.

DESCRIPTION OF THE DRAWINGS

For better understanding, the invention will now be described, by way of example only, with reference to the annexed drawings, in which.

DESCRIPTION OF A SPECIFIC EMBODIMENT

Figure 1:
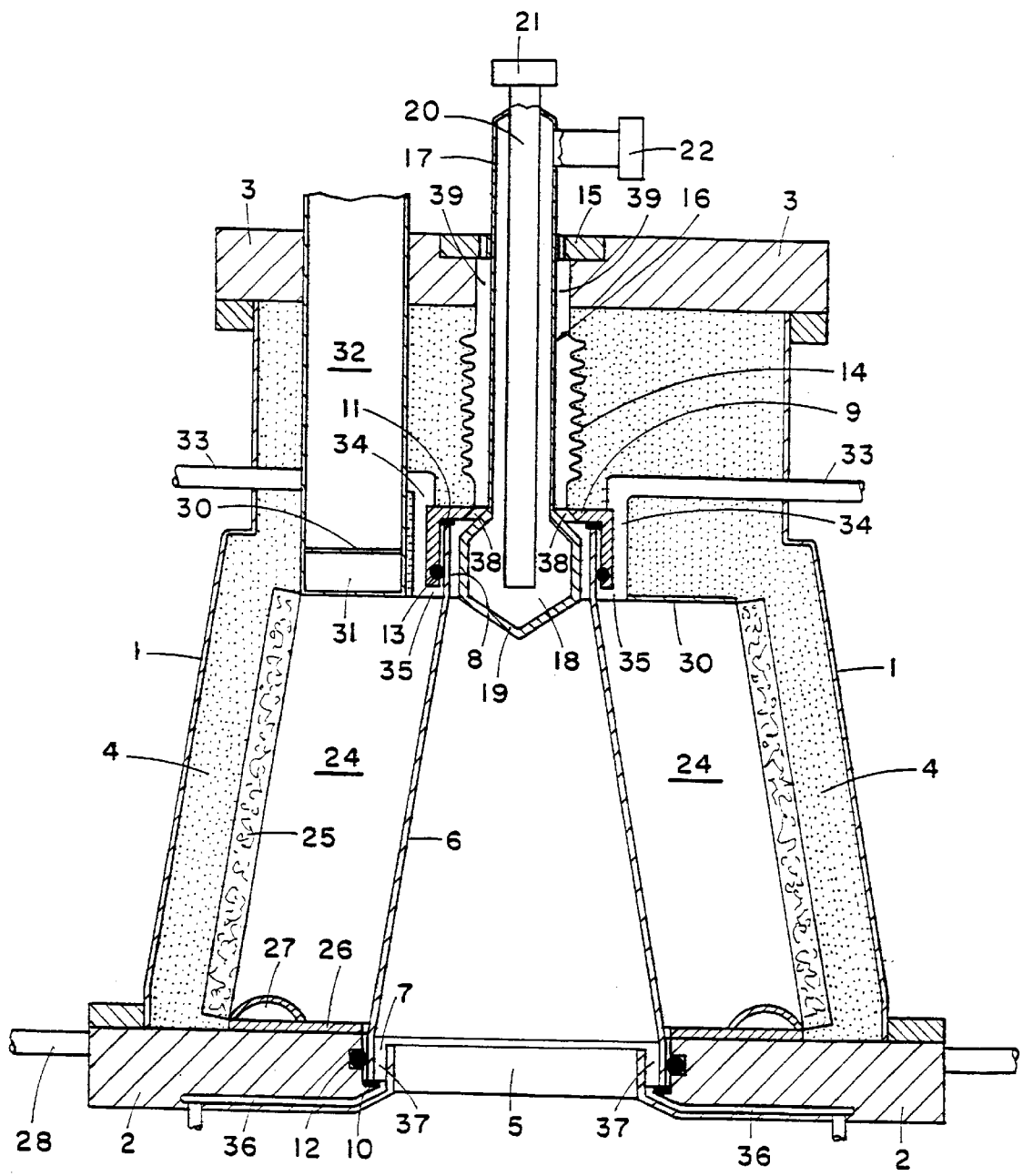
FIG. 1 is an axial cross-sectional view of a central solar receiver according to the invention.

A central solar receiver according to the present invention is illustrated in FIG. 1 and is adapted to work with a multicomponent fluid mixture comprising a gaseous suspension of solid particles made of an absorbing material. As shown, the receiver comprises a tubular metal housing 1 with front and rear end walls 2 and 3 and lined from within with an insulation layer 4. Beyond a radiation admitting aperture in form of a central circular hole 5 in the front end wall 2 there is mounted a tubular frusto-conical window 6 suitable for the admission of solar radiation and for withstanding high temperatures and high pressure. Near its large diameter end the window 6 comprises a cylindrical rim 7 and near its small diameter end the window comprises a cylindrical rim 8. To the rear of window 6 there is located an inverted cup-shaped member 9 and rims 7 and 8 of the window 6 are set within suitably shaped grooves in, respectively, the end plate 2 and member 9 with the interposition of sealing washers 10 and 11. The setting of window 6 further comprises an O-ring 12 located opposite rim 7 in a groove of end plate 2 and an O-ring 13 located opposite rim 8 within a groove of the skirt of the inverted cup-shaped member 9.

The inverted cup-shaped member 9 is connected to the front end of a bellows 14, the rear end of which bears on a central, annular sealing plate 15. The central sealing plate 15 and inverted cup-shaped member 9 hold between them a hollow body 16 having a cylindrical portion 17 and a conical tip portion 18 which has an outwardly highly polished reflector surface 19. The hollow body 17 houses a tube 20 with cooling water inlet 21 and body 17 itself has an outlet 22 for the spent cooling water.

A radiation absorber chamber 24 having its front end near front end wall 2 and an opposite rear end, is formed between window 6 and an oppositely located coaxial frusto-conical body 25 lining the insulation layer 4. Window 6 forms the inner wall and body 25 the outer wall of the absorber chamber 24. At the front end of chamber 24 is located an annular injection device 26 for injecting into the absorber chamber the fluid mixture. The injection device 26 comprises at its rear side a plurality of injection members 27 each extending in a direction which is essentially tangential to wall 25. Preferably, the injection members are oriented with a measure of inclination towards the rear end of the chamber. In this way the desired swirling of the injected fluid mixture is facilitated and the formation of stagnation points or separation of the boundary layer and creation of recirculation zones is prevented. Each injector 27 is associated with a feeder duct 28.

At its rear end the radiation absorber chamber 24 comprises an annular collection device 30 with an egress opening 31 for the collection of the fluid mixture advancing in a helical flow across chamber 24. Egress opening 31 leads into a tubular vent 32 serving for the withdrawal of the particle suspension from chamber 24. The rim of egress opening 31 has a sharp edge to prevent the formation of stagnation points, separation of a boundary layer and creation of recirculation zones.

In the region near the rear end wall 3, housing 1 is fitted with a number of inlet pipes 33 for working gas, each opening into a rear duct 34 from where the gas is injected into chamber 24 through an annular nozzle 35 so as to sweep window 6.

The front end wall 2 comprises a number of ducts 36 connected to air pumping means (not shown) and opening into an annular groove 37 whereby the outer surface of window 6 is swept with air and is cooled and cleaned.

The web of the inverted cup-shaped member 9 comprises a plurality of air passage bores 38 in even circular distribution, which link the frusto-conical space outside of window 6 via a tubular duct 39 formed between the cylindrical portion 17 of body 16 and bellows 34, and via bores 40 of sealing plate 15, with the ambient atmosphere at the rear of the receiver, thereby enabling the escape of cooling air injected via the annular groove 37.

Figure 2:
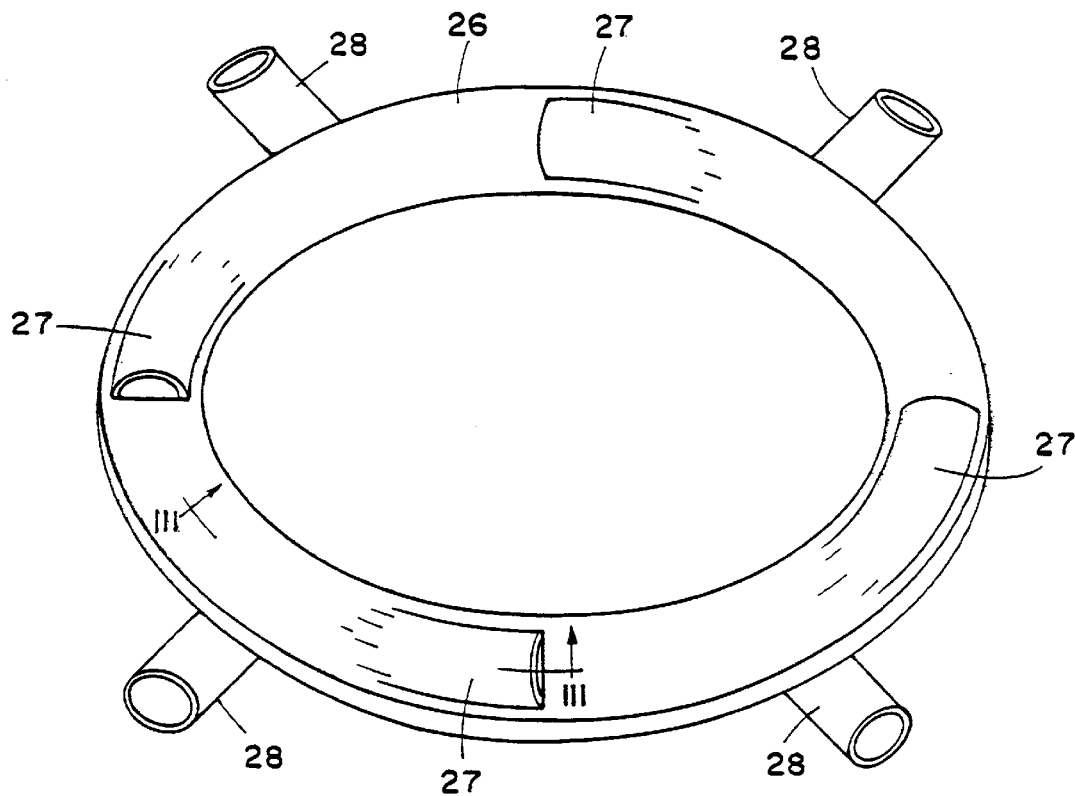
FIG. 2 is a perspective view of an injection device in a central solar receiver according to the invention.
Figure 3:
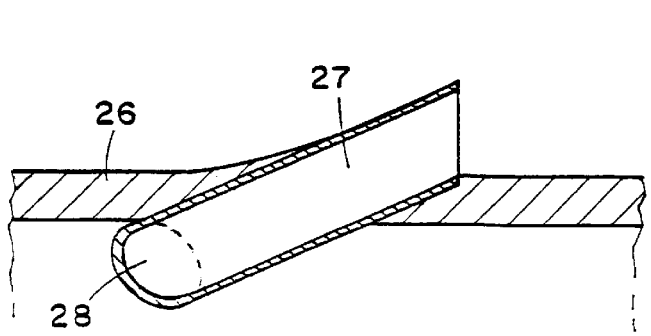
FIG. 3 is a section along line III—III in FIG. 2.

Attention is now directed to FIGS. 2 and 3 showing the design of the injection device 26. As shown, the injector is in form of an annular body having on its rear side that faces the rear of the receiver four injection members 27 each having a tubular portion mounted with a measure of inclination towards the rear end wall of the chamber 24, which ensures a smooth helical flow of the ejected fluid mixture without the formation of stagnation points or separation of the boundary layer and the creation of recirculation zones. Each of the injection members 27 is associated with an inlet pipe 28.

Figure 4:
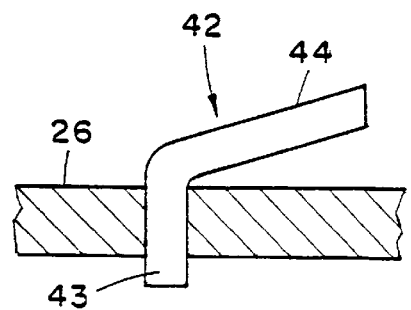
FIG. 4 is a partial section across another embodiment of an injection device in a central solar receiver according to the invention.

If desired, the assembly 27,28 may be replaced by an essentially L-shaped duct 43 having an inlet part 43 and an injector part 44 (FIG. 4).

Figure 6:
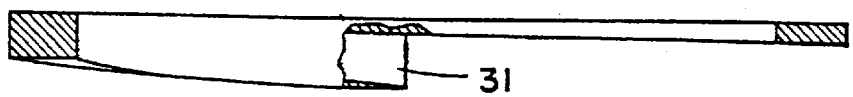
FIG. 6 is a section along line VI—VI of FIG. 5.
Figure 5:
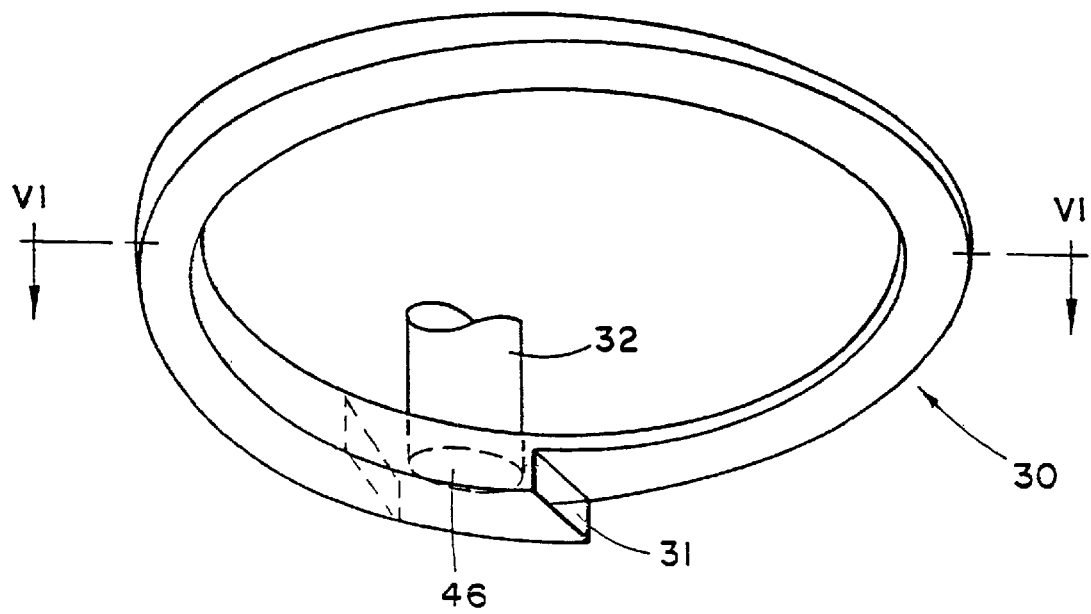
FIG. 5 is a perspective view of an egress device in a central solar receiver according to the invention.

The design of the collection device 30 is more closely shown in FIGS. 5 and 6. As shown, device 30 comprises a massive, annular-helical body 30 having an egress opening 31 linked to the tubular vent 32 either directly or, for example, via a chamber 46.

If desired, device 30 may have several egress openings such as opening 31, each linked to a vent such as vent 32 or equivalent means.

The operation of the central solar receiver according to the invention is as follows:

The fluid mixture in the form of a particle suspension is continuously injected into the absorber chamber 24 via injection device 26 and is continuously withdrawn via collection device 30 and the associated tubular vent 32. Due to the design of the injection device the injected particle suspension advances in a swirling flow across chamber 24 from the front to the rear end, and due to the centrifugal force acting on the flowing particle suspension contact between the particles and window 6 is minimized or even completely eliminated. To further reduce the friction and keep window 6 clean, the inner surface of the window is continuously swept by working gas injected via pipes 33 and annular nozzle 35, and the outer surface of the window is cooled and kept clean by sweeping it with ambient air injected via duct 36 and groove 37 and withdrawn via holes 38, duct 39 and bores 40.

Cooling water is continuously introduced via opening 21 and duct 20 into hollow body 16 and is discharged therefrom via opening 22, whereby the reflector surface 19 is cooled.

Concentrated solar radiation is continuously admitted via aperture 5. Some of the incident solar radiation penetrates directly through the window 6 and impinges upon the suspended particles which circulate within the absorber chamber 24, while another part impinges on the reflector surface 19 and is reflected therefrom into the absorber chamber 24.

As the particle suspension swirls inside chamber 24 the particles absorb the incoming radiation and any remainder of the radiation is absorbed by wall 25. The irradiated particles heat up and transfer heat to the working gas. Depending on the circumstances, utilizable heat may be withdrawn from the working gas outside the receiver; or the hot and pressurized working gas may, after separation of the particles, be injected into the turbine of an electric power generator; or else the particles may participate in an endothermic chemical reaction or catalyze such a reaction between components of the working gas. Thus, what reaches the tubular vent 32 may either be a particle suspension or a single phase gas. In the former case the two phases are either separated and the particles are cooled and recycled for admixture to fresh working gas, or the particle suspension is cooled and then recirculated as such to the receiver. If a single phase gaseous mixture of chemical reaction products is discharged through vent 32, it is removed for working up and a fresh particle suspension is introduced into the receiver.

Due to the frusto-conical shape of window 6, the pressure acting from within results in compression stresses in the window. Accordingly, this window is well suited to withstand the elevated pressure prevailing within the absorber chamber 24. In the course of operation any thermal expansion is absorbed by bellows 14, whereby any damage to the window and other components of the receiver is avoided.

It should be mentioned that the fluid mixture may consist of components different from that of the preferred embodiments. Thus, the mixture may comprise liquid with absorbing solid particles or several liquids or gases of which at least one absorbs radiation.

We claim:

1. A central solar receiver comprising a tubular housing with a central axis, an open aperture for admitting incident concentrated solar radiation and an absorber chamber having an outer wall, two oppositely located ends, an inner-wall-forming substantially tubular transparent window co-axial with said tubular housing through which said concentrated solar radiation enters said absorber chamber, injection means near a first of said oppositely located ends and at least one egress opening means near a second of said oppositely located ends, said injection means being capable of injecting into the absorber chamber a multicomponent fluid mixture at least one compound of which is capable of causing thermal and/or mechanical damage to said window and comprising at least one radiation absorbing component for absorbing said concentrated solar radiation, said at least one egress opening being capable of enabling the egress of the fluid mixture from the absorber chamber, and said injection means are so designed that the fluid mixture is injected into the absorber chamber adjacent and essentially tangentially to the outer wall, whereby contact between the mixture and the window is reduced.

2. A central solar receiver according to claim 1, wherein said injection means are capable of injecting the fluid mixture with a measure of inclination towards the second of said oppositely located ends, whereby the fluid mixture passes through the absorber chamber from the first to the second of said oppositely located ends in an essentially swirling flow.

3. The central solar receiver according to claim 1, wherein the absorber chamber and window are frusto-conical.

4. The central solar receiver according to claim 1, wherein the absorber chamber and window are cylindrical.

5. The central solar receiver according to claim 1, wherein said multicomponent mixture comprises a working fluid in the gas phase.

6. The central solar receiver according to claim 1, wherein said multicomponent mixture comprises a working fluid in the liquid phase.

7. The central solar receiver according to claim 1, wherein said at least one radiation absorbing component is in the solid phase.

8. The central solar receiver according to claim 1, wherein said at least one radiation absorbing component is in the liquid phase.

9. The central solar receiver according to claim 1, wherein said at least one radiation absorbing component is in the gas phase.

10. The central solar receiver according to claim 1, comprising means for separation of the fluid mixture emerging through said at least one egress opening.

11. The central solar receiver according to claim 1, comprising means for the recirculation of the said fluid mixture emerging through said at least one egress opening.

12. The central solar receiver according to claim 1, comprising at the first of said oppositely located ends of the absorber chamber an annular injection device with front and rear sides, having at the rear side a plurality of injection tubes, each being oriented essentially tangentially to the outer wall of the absorber chamber.

13. The central solar receiver according to claim 12, wherein said injection tubes are oriented with a measure of inclination toward the second of said oppositely located ends of the chamber.

14. The central solar receiver according to claim 1, comprising near the second of said oppositely located ends of the absorber chamber an annular collection device with a helical gliding surface leading into at least one egress opening linked to a withdrawal duct.

15. The central solar receiver according to claim 1, wherein said at least one egress opening has a sharp edged rim whereby the formation of stagnation points, the separation of a boundary layer and the creation of recirculation zones is prevented.

16. The central solar receiver according to claim 3, wherein said transparent window has a large diameter cylindrical rim at the front end and a small diameter cylindrical rim near the rear end.

17. The central solar receiver according to claim 16, wherein the small diameter rear end of the window bears on a bellows, whereby any thermal expansion thereof is absorbed by the bellows.

18. The central solar receiver according to claim 1, comprising means for sweeping an inner surface of said window facing said absorber chamber with pressurized working fluid, whereby the window is cleaned and cooled from within the absorber chamber.

19. The central solar receiver according to claim 1, comprising means for sweeping an outer surface of said window facing away from said absorber chamber with ambient air, whereby the window is cooled and cleaned from outside the absorber chamber.

20. The central solar receiver according to claim 1 serving for the generation of utilizable heat, wherein the radiation absorbing component is inert to the other components of the fluid mixture.

21. The central solar receiver according to claim 1 serving for the performance of a heat-induced chemical reaction, wherein one or more components of the fluid mixture are of materials selected from the group of chemical reactants that participate in the reaction.

22. The central solar receiver according to claim 1 serving for the performance of a heat-induced chemical reaction, wherein one or more components of the fluid mixture is a catalyst.

23. The central solar receiver according to claim 21, wherein said egress opening is capable of enabling the egress of chemical reaction products, formed by said reaction in the absorber chamber, from the absorber chamber.

24. The central solar receiver according to claim 22, wherein said egress opening is capable of enabling the egress of chemical reaction products, formed by said reaction in the absorber chamber, from the absorber chamber.

25. The central solar receiver according to claim 1, wherein the injection means comprises injection tubes, each being oriented essentially tangentially to the outer wall of the absorber chamber.

26. A central solar receiver comprising a tubular housing with a central axis, an open aperture for admitting incident concentrated solar radiation and a frusto-conical absorber chamber having an outer wall, two oppositely located ends, an inner-wall-forming frusto-conical transparent window co-axial with said tubular housing through which said concentrated solar radiation enters said absorber chamber, injection means near a first of said oppositely located ends and at least one egress opening means near a second of said oppositely located ends, said injection means being capable of injecting into the absorber chamber a multicomponent fluid mixture comprising at least one radiation absorbing component for absorbing said concentrated solar radiation, said at least one egress opening being capable of enabling the egress of the fluid mixture from the absorber chamber, and said injection means are so designed that the fluid mixture is injected into the absorber chamber adjacent and essentially tangentially to the outer wall, whereby contact between the mixture and the window is reduced.

27. A central solar receiver comprising a tubular housing with a central axis, an open aperture for admitting incident concentrated solar radiation and an absorber chamber having an outer wall, two oppositely located ends, an inner-wall-forming substantially tubular transparent window co-axial with said tubular housing through which said concentrated solar radiation enters said absorber chamber, injection means near a first of said oppositely located ends and at least one egress opening means near a second of said oppositely located ends, said injection means being capable of injecting into the absorber chamber a multicomponent fluid mixture comprising at least one radiation absorbing component for absorbing said concentrated solar radiation, said at least one egress opening being capable of enabling the egress of the fluid mixture from the absorber chamber, and said injection means being in the form of injection tubes disposed adjacent to the outer wall and oriented essentially tangentially to the outer wall so that the fluid mixture is injected into the absorber chamber adjacent and essentially tangentially to the outer wall, whereby contact between the mixture and the window is reduced.

28. A central solar receiver serving for the performance of a heat-induced chemical reaction comprising a tubular housing with a central axis, an open aperture for admitting incident concentrated solar radiation and an absorber chamber having an outer wall, two oppositely located ends, an inner-wall-forming substantially tubular transparent window co-axial with said tubular housing through which said concentrated solar radiation enters said absorber chamber, injection means near a first of said oppositely located ends and at least one egress opening means near a second of said oppositely located ends, said injection means being capable of injecting into the absorber chamber a multicomponent fluid mixture comprising at least one radiation absorbing component for absorbing said concentrated solar radiation and one or more components of material selected from the group of chemical reactants that participate in the reaction, said at least one egress opening being capable of enabling the egress of reaction products from the absorber chamber, and said injection means are so designed that the fluid mixture is injected into the absorber chamber adjacent and essentially tangentially to the outer wall, whereby contact between the mixture and the window is reduced.

\* \* \* \* \*

UNITED STATES PATENT AND TRADEMARK OFFICE
CERTIFICATE OF CORRECTION

PATENT NO. : 5,947,114
DATED : September 7, 1999
INVENTOR(S) : Avi Kribus, Pinchas Doron, Jacob Karni It is certified that error appears in the above-identified patent and that said Letters Patent is hereby corrected as shown below:

Claim 1,
Line 12, change "compound" to -- component --

Claim 28,
Line 14, change "material" to -- materials --

Signed and Sealed this

Thirty-first Day of July, 2001

Attest:

NICHOLAS P. GODICI
Attesting Officer
Acting Director of the United States Patent and Trademark Office